(12) United States Patent
Matsumoto et al.

(10) Patent No.: US 10,741,177 B2
(45) Date of Patent: Aug. 11, 2020

(54) DETERMINING A TYPE OF SPEECH RECOGNITION PROCESSING ACCORDING TO A REQUEST FROM A USER

(71) Applicant: FUJITSU LIMITED, Kawasaki-shi, Kanagawa (JP)

(72) Inventors: Chikako Matsumoto, Yokohama (JP); Naoshi Matsuo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 15/889,406

(22) Filed: Feb. 6, 2018

(65) Prior Publication Data

US 2018/0240460 A1    Aug. 23, 2018

(30) Foreign Application Priority Data

Feb. 23, 2017  (JP) ................................ 2017-032063

(51) Int. Cl.
| | |
|---|---|
| *G10L 15/00* | (2013.01) |
| *G10L 15/22* | (2006.01) |
| *G10L 15/28* | (2013.01) |
| *G10L 15/08* | (2006.01) |
| *G10L 21/00* | (2013.01) |
| *G10L 15/30* | (2013.01) |

(52) U.S. Cl.
CPC .............. *G10L 15/22* (2013.01); *G10L 15/08* (2013.01); *G10L 15/28* (2013.01); *G10L 21/00* (2013.01); *G10L 15/30* (2013.01); *G10L 2015/088* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 4,896,358 | A * | 1/1990 | Bahler | G10L 25/00 704/240 |
| 5,675,706 | A * | 10/1997 | Lee | G10L 15/04 704/254 |
| 6,675,159 | B1 * | 1/2004 | Lin | G06F 17/2705 |
| 6,708,150 | B1 * | 3/2004 | Hirayama | G01C 21/3608 704/243 |
| 7,742,922 | B2 * | 6/2010 | Goller | G06F 3/167 704/270.1 |
| 7,769,591 | B2 * | 8/2010 | White | G10L 15/30 704/255 |
| 9,672,817 | B2 * | 6/2017 | Yong | G10L 15/08 |
| 2013/0085755 | A1 * | 4/2013 | Bringert | G10L 15/28 704/235 |

(Continued)

FOREIGN PATENT DOCUMENTS

| | | |
|---|---|---|
| JP | 2015-011170 | 1/2015 |
| JP | 2016-095383 | 5/2016 |
| JP | 2016-183993 | 10/2016 |

*Primary Examiner* — Jesse S Pullias
(74) *Attorney, Agent, or Firm* — Fujitsu Patent Center (57) ABSTRACT

A speech recognition method to be performed by a computer, the method including: detecting a first keyword uttered by a user from an audio signal representing voice of the user; detecting a term indicating a request of the user from sections that follow the first keyword in the audio signal; and determining a type of speech recognition processing applied to the following sections in accordance with the detected term indicating the request of the user.

10 Claims, 9 Drawing Sheets

(56) References Cited

U.S. PATENT DOCUMENTS

| | | | |
|---|---|---|---|
| 2014/0156277 A1* | 6/2014 | Fujii | G10L 15/26 704/251 |
| 2014/0278404 A1* | 9/2014 | Holmes | G10L 15/265 704/235 |
| 2016/0125883 A1 | 5/2016 | Koya | |

* cited by examiner

| REQUEST | REQUEST TERM GROUP | REPLACEMENT KEYWORD | REPLACEMENT KEYWORD AUDIO DATA |
|---|---|---|---|
| GENERAL PURPOSE | | KENSAKU-KUN | HY-01.wav |
| WEATHER | WEATHER, SUNNY, COLD, HOT, TEMPERATURE, HUMIDITY, ... | DR. WEATHER | TK-01.wav |
| DISASTER | EARTHQUAKE, TSUNAMI, TYPHOON, THUNDER, TORNADO, ... | DISASTER PREVENTION INFORMATION | SG-01.wav |
| HEALTH | HEALTH, COLD, INFLUENZA, VIRUS, ... | HEALTH INFORMATION | KK-01.wav |
| MEAL | MEAL, RESTAURANT, HUNGRY, RICE, ... | RESTAURANT NAVIGATION | SH-01.wav |
| ECONOMY | ECONOMY, STOCK PRICE, FOREIGN EXCHANGE, INFLATION, DEFLATION, ... | ECONOMIC RESEARCH | KZ-01.wav |

| REQUEST | REQUEST AUDIO DATA | REQUEST TERM GROUP | REPLACEMENT KEYWORD | REPLACEMENT KEYWORD AUDIO DATA |
|---|---|---|---|---|
| GENERAL PURPOSE | | | KENSAKU-KUN | HY-01.wav |
| WEATHER | TK-00.wav | WEATHER, SUNNY, COLD, HOT, TEMPERATURE, HUMIDITY, ... | DR. WEATHER | TK-01.wav |
| DISASTER | SG-00.wav | EARTHQUAKE, TSUNAMI, TYPHOON, THUNDER, TORNADO, ... | DISASTER PREVENTION INFORMATION | SG-01.wav |
| HEALTH | KK-00.wav | HEALTH, COLD, INFLUENZA, VIRUS, ... | HEALTH INFORMATION | KK-01.wav |
| MEAL | SH-00.wav | MEAL, RESTAURANT, HUNGRY, RICE, ... | RESTAURANT NAVIGATION | SH-01.wav |
| ECONOMY | KZ-00.wav | ECONOMY, STOCK PRICE, FOREIGN EXCHANGE, INFLATION, DEFLATION, ... | ECONOMIC RESEARCH | KZ-01.wav |

| REQUEST | REQUEST TERM GROUP | REPLACEMENT KEYWORD | REPLACEMENT KEYWORD AUDIO DATA |
|---|---|---|---|
| GENERAL PURPOSE | | KENSAKU-KUN | HY-01.wav |
| WEATHER | WEATHER, SUNNY, COLD, HOT, TEMPERATURE, HUMIDITY, ... | DR. WEATHER<br>WEATHER NEWS<br>CURRENT WEATHER<br>... | TK-01.wav<br>TK-02.wav<br>TK-03.wav<br>... |
| DISASTER | EARTHQUAKE, TSUNAMI, TYPHOON, THUNDER, TORNADO, ... | DISASTER INFORMATION<br>DISASTER PREVENTION NAVIGATION<br>DISASTER PREVENTION NEWSLETTER<br>... | SG-01.wav<br>SG-02.wav<br>SG-03.wav<br>... |
| HEALTH | HEALTH, COLD, INFLUENZA, VIRUS, ... | HEALTH INFORMATION<br>HOSPITAL INFORMATION<br>CLINICAL RESEARCH<br>... | KK-01.wav<br>KK-02.wav<br>KK-03.wav<br>... |
| MEAL | MEAL, RESTAURANT, HUNGRY, RICE, ... | RESTAURANT NAVIGATION<br>GOURMET SEARCH<br>DELICIOUS FOOD RESTAURANT<br>... | SH-01.wav<br>SH-02.wav<br>SH-03.wav<br>... |
| ECONOMY | ECONOMY, STOCK PRICE, FOREIGN EXCHANGE, INFLATION, DEFLATION, ... | ECONOMIC RESEARCH<br>FOREIGN EXCHANGE AND STOCK<br>REAL TIME CHART<br>... | KZ-01.wav<br>KZ-02.wav<br>KZ-03.wav<br>... |

DETERMINING A TYPE OF SPEECH RECOGNITION PROCESSING ACCORDING TO A REQUEST FROM A USER

CROSS-REFERENCE TO RELATED APPLICATION

This application is based upon and claims the benefit of priority of the prior Japanese Patent Application No. 2017-32063, filed on Feb. 23, 2017, the entire contents of which are incorporated herein by reference.

FIELD

The embodiments discussed herein are, for example, related to a speech recognition computer program medium, a speech recognition apparatus, and a speech recognition method.

BACKGROUND

In a related art, a speech recognition technology in which an audio content that has been uttered by a speaker is recognized from an audio signal obtained by collecting voice audio that has been uttered by the speaker is utilized in a user interface. A technology has been proposed in which, in such a user interface, a keyword is detected from an audio signal, a section in the audio signal, which is a target of speech recognition, is defined, or a speech recognition server is identified, in accordance with the detected keyword (for example, see Japanese Laid-open Patent Publication Nos. 2015-11170, 2016-95383, and 2016-183993).

When two or more different speech recognition servers (for example, two or more different search engines each using speech recognition) exist, two or more different types of speech recognition processing may be used. In such a case, it is desirable that the user is allowed to select appropriate speech recognition processing corresponding to usage or recognition accuracy from among the two or more types of speech recognition processing. However, as described above, when a speech recognition server is identified in accordance with a keyword, it is desirable that the user utters a keyword corresponding to a speech recognition server to be used in order to select the speech recognition server. Therefore, it is desirable that the user remembers keywords for respective speech recognition servers. Thus, a technology is desired in which speech recognition processing to be applied is allowed to be selected from among two or more types of speech recognition processing, and the selected speech recognition processing is allowed to be started by a common keyword that does not depend on a type of speech recognition processing.

An object of an embodiment is to provide a speech recognition computer program by which speech recognition processing that has been selected from among two or more types of speech recognition processing is allowed to be started by a common keyword that does not depend on a type of speech recognition processing.

SUMMARY

According to an aspect of the invention, a speech recognition method to be performed by a computer, the method including: detecting a first keyword uttered by a user from an audio signal representing voice of the user; detecting a term indicating a request of the user from sections that follow the first keyword in the audio signal; and determining a type of speech recognition processing applied to the following sections in accordance with the detected term indicating the request of the user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A speech recognition device, and a speech recognition method and a speech recognition computer program used for the speech recognition device are described below with reference to drawings.

When the speech recognition device detects a speech recognition start keyword that is defined in advance from an audio signal representing voice audio that has been uttered by the user, the speech recognition device detects a request term that is a term assumed to indicate a request of the user in a section of the audio signal, which follows the keyword. The speech recognition device identifies a request corresponding to the detected request term. In addition, the speech recognition device generates an adjusted audio signal by replacing audio data of the detected start keyword with audio data of a keyword for replacement, which corresponds to the identified request, and outputs the adjusted audio signal to the speech recognition server. As a result, the user may select and use an appropriate type of speech recognition processing only by uttering a common start keyword that does not depend on a type of speech recognition processing to be used and uttering a request after the common start keyword. Hereinafter, the keyword for replacement is simply referred to as a replacement keyword.

The speech recognition device may be implemented in various devices each of which uses a man-machine interface using speech recognition, for example, various terminals including a mobile terminal such as a mobile phone, a navigation system, a computer, a robot and the like. In the following description, it is assumed that the speech recognition device is installed in the terminal.

Figure 1:
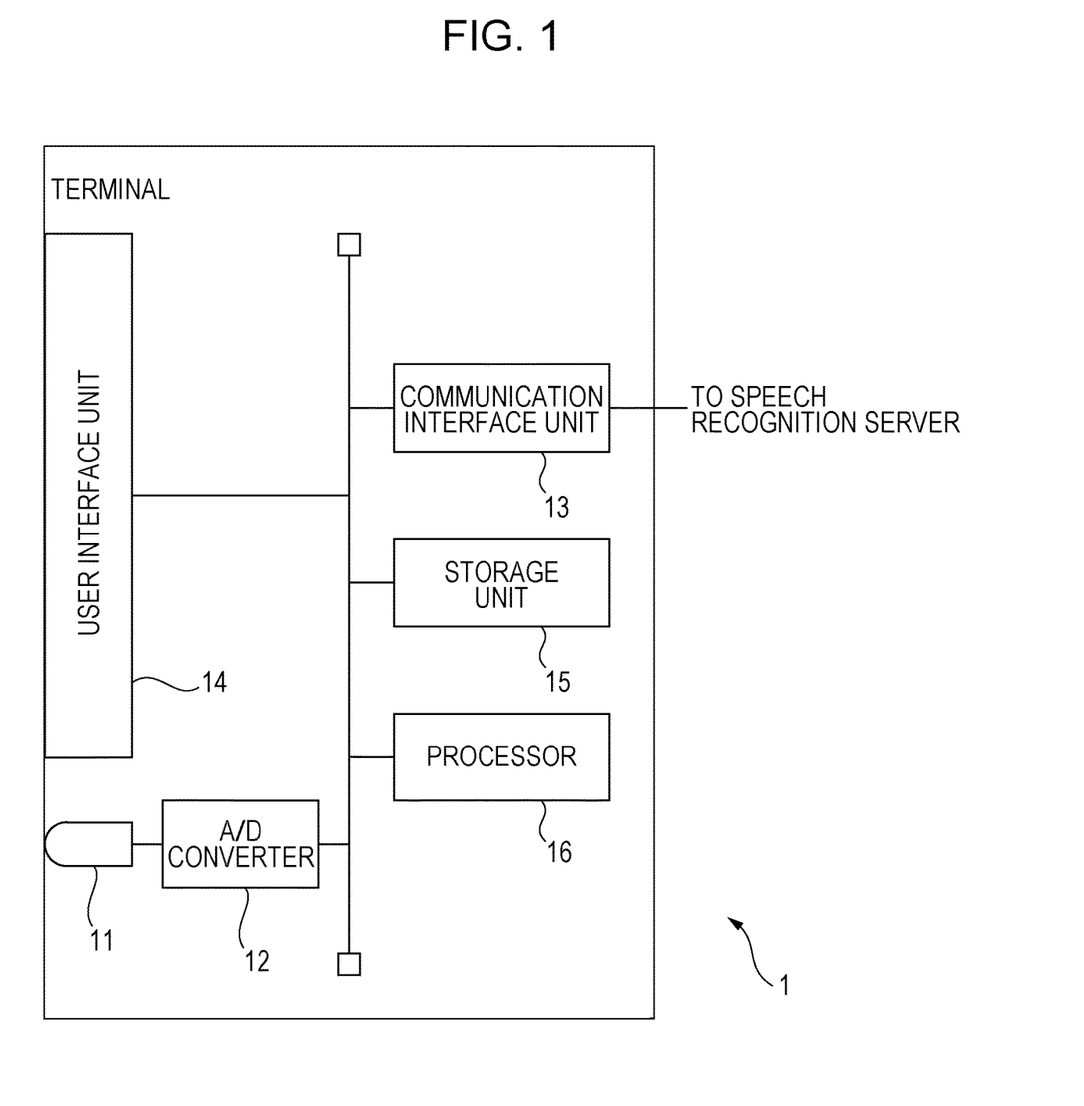
FIG. 1 is a hardware configuration diagram of a terminal in which a speech recognition device according to an embodiment is installed.

FIG. 1 is a hardware configuration diagram of a terminal in which the speech recognition device according to an embodiment is installed. A terminal 1 includes a microphone 11, an analog/digital converter 12, a communication interface unit 13, a user interface unit 14, a storage unit 15, and a processor 16.

The microphone 11 is an example of an audio input unit which collects audio near to the terminal 1, which includes a voice of the user, and generates an analog audio signal corresponding to the strength of the audio. In addition, the microphone 11 outputs the analog audio signal to the analog/digital converter 12 (hereinafter referred to as an A/D converter). The A/D converter 12 samples the analog audio signal with a specific sampling rate so as to digitalize the analog audio signal. The sampling rate is set, for example, at 16 kHz to 32 kHz such that a frequency band used to analyze the voice of the user from the audio signal becomes less than a Nyquist frequency. In addition, the A/D converter 12 outputs the digitalized audio signal to the processor 16. Hereinafter, the digitalized audio signal is simply referred to as an audio signal.

The communication interface unit 13 transmits an inquiry signal including the adjusted audio signal that is a speech recognition target, which has been received from the processor 16, to a speech recognition server (not illustrated) through a communication network (not illustrated) in accordance with a communication standard to which the terminal 1 conforms. In addition, the communication interface unit 13 receives a response signal including a speech recognition result from the speech recognition server through the communication network 13. Therefore, the communication interface unit 13 includes, for example, a circuit used to couple the terminal 1 to the communication network and execute various pieces of communication processing in accordance with the communication standard to which the terminal 1 conforms. The communication network to which the terminal 1 is coupled may be, for example, a wired communication network or a wireless communication network. In addition, the communication standard to which the terminal 1 conforms is, for example, Ethernet (registered trademark), Bluetooth (registered trademark), or a communication standard for mobile communication such as so-called Long Term Evolution (LTE) or LTE-Advanced.

The user interface unit 14 includes, for example, a device in which a display device and an input device are integrated with each other such as a touch panel display. In addition, for example, the user interface unit 14 displays the speech recognition result that has been received from the speech recognition server. The user interface unit 14 may include the display device and the input device separately.

The storage unit 15 includes, for example, a readable/writable non-volatile semiconductor memory and a readable/writable volatile semiconductor memory. In addition, the storage unit 15 may include a magnetic recording medium or an optical recording medium, and an access device for the recording medium. In addition, the storage unit 15 stores a speech recognition processing computer program executed by the processor 16, various pieces of data used for speech recognition processing, and various pieces of data generated in the course of the speech recognition processing. For example, the storage unit 15 stores a start keyword, a phoneme series of the start keyword, and a reference table indicating a correspondence relationship between a request, a request term, and a replacement keyword. In addition, the storage unit 15 may store the speech recognition result that has been received from the speech recognition server, a program for processing executed in response to the speech recognition result, and various pieces of data used for the program.

The processor 16 is an example of a speech recognition device which includes, for example, one or a plurality of processing unit and peripheral circuits. In addition, the processor 16 determines a type of speech recognition processing applied in accordance with utterances from the user by executing the speech recognition processing.

The detail of the processor 16 is described below.

Figure 2:
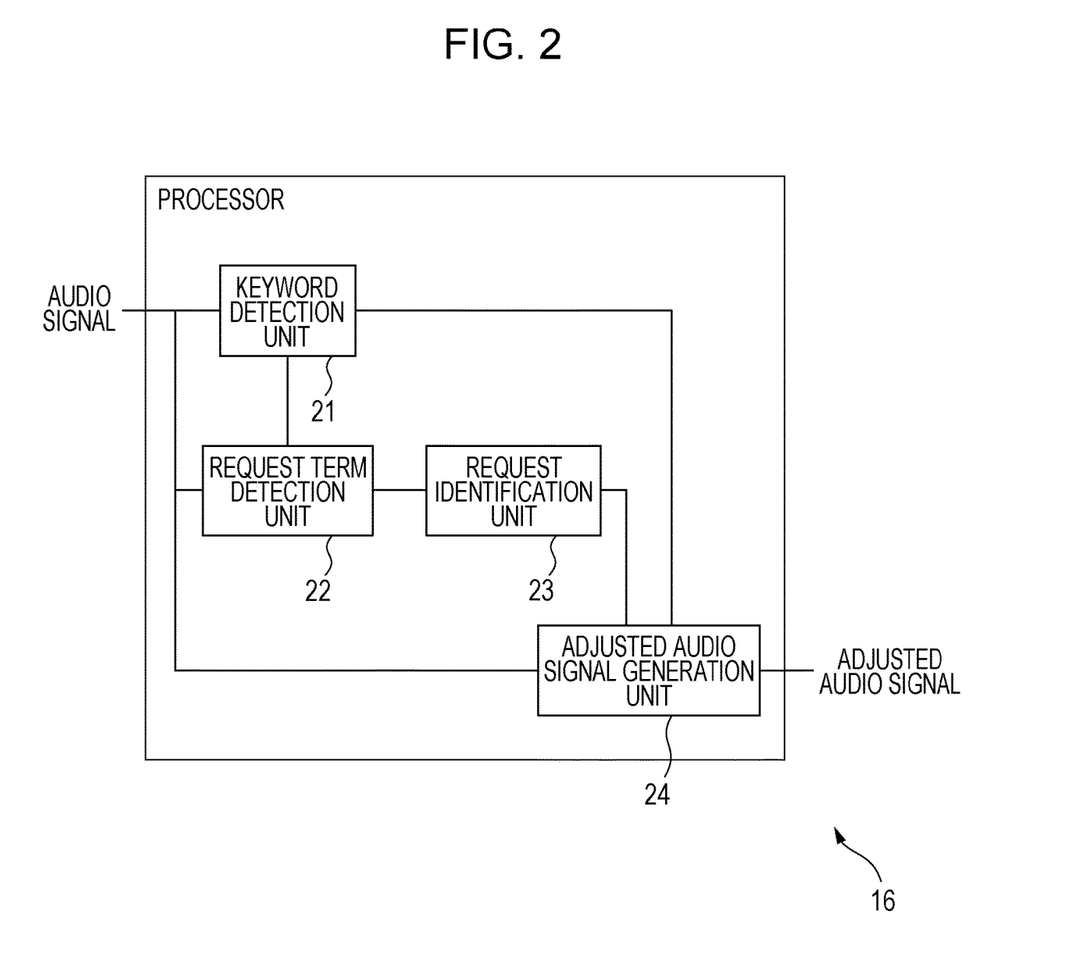
FIG. 2 is a functional block diagram of a processor for speech recognition processing.

FIG. 2 is a functional block diagram of the processor 16 for the speech recognition processing. The processor 16 includes a keyword detection unit 21, a request term detection unit 22, a request identification unit 23, and an adjusted audio signal generation unit 24. The units included in the processor 16 are, for example, function modules realized by a computer program operated in a processing unit included in the processor 16. Alternatively, the units included in the processor 16 may constitute one or a plurality of integrated circuits that realize the functions of the units.

For example, when the user instructs an operation by audio through the user interface unit 14, the processor 16 starts the speech recognition processing. Alternatively, when the terminal 1 starts, the processor 16 starts the speech recognition processing. In addition, when the speech recognition processing starts, the processor 16 executes processing of each of the above-described units.

Figure 3:
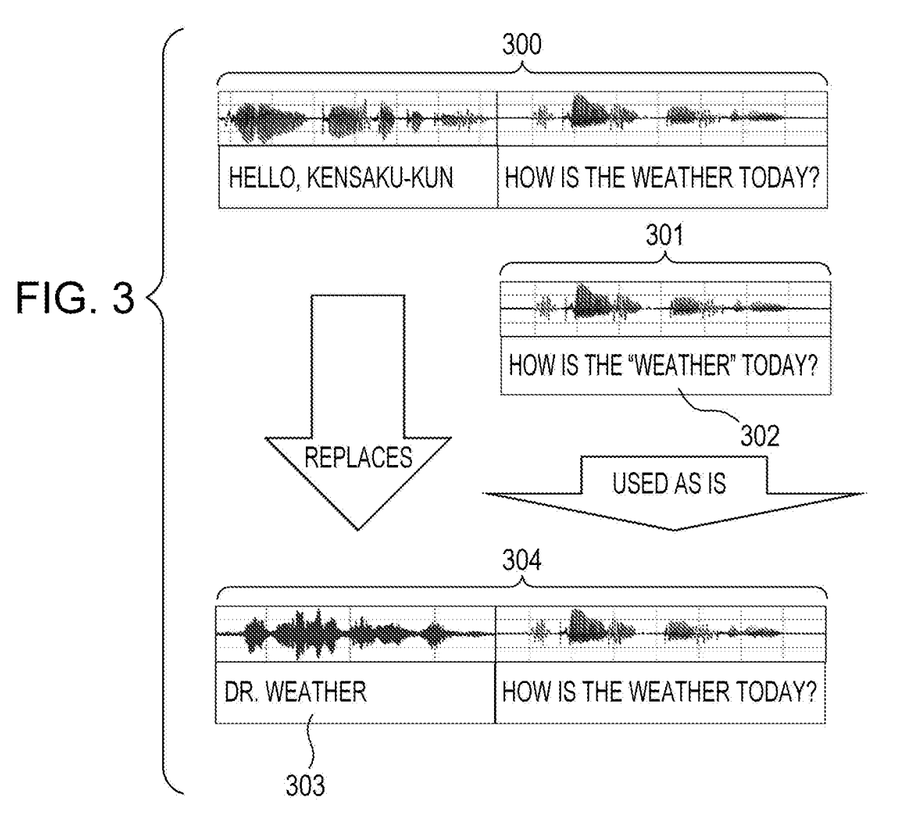
FIG. 3 is a diagram illustrating the overview of the speech recognition processing.

FIG. 3 is a diagram illustrating the overview of the speech recognition processing executed by the processor 16. In this example, an audio signal 300 that has been input through the microphone 11 indicates user audio, which is "Hello, Kensaku-kun, how is the weather today?". Here, it is assumed that "Hello, Kensaku-kun" is a start keyword (first keyword). Here, the term "Kensaku" means "Search" in Japanese. In this case, when the processor 16 detects the keyword "Hello, Kensaku-kun" from the audio signal 300, the processor 16 detects a request term indicating a request of the user from a section 301 of the audio signal 300, in which the user utters words which follows the keyword. For example, it is assumed that "weather" is a request term. In this case, the processor 16 detects a request term "weather" 302 from the section 301. In addition, the processor 16 identifies a user's request "weather" corresponding to the request term "weather" 302. In addition, the processor 16 identifies a replacement keyword (second keyword) "Dr. Weather" 303 corresponding to the request "weather" and reads audio data of the replacement keyword "Dr. Weather" 303 from the storage unit 15. The audio data indicates an audio waveform of the corresponding keyword (for example, "Dr. Weather"). The processor 16 generates an adjusted audio signal 304 by replacing audio data of the section corresponding to the keyword "Hello, Kensaku-kun" in the audio signal 300 with the identified audio data. In addition, the processor 16 generates an inquiry signal including the adjusted audio signal 304 and outputs the inquiry signal to the speech recognition server through the communication interface unit 13.

The keyword detection unit 21 detects the start keyword included in the audio signal when the speech recognition processing starts. For example, the start keyword may be assumed to be a single keyword used in common, which does not depend on a type of applied speech recognition processing. In addition, for example, the start keyword is set in advance, and a phoneme series of the start keyword is stored in the storage unit 15.

The keyword detection unit 21 detects the keyword, for example, by applying any one of various word spotting technologies to the audio signal. For example, the keyword detection unit 21 divides the audio signal into frame units each having a specific length. The frame length is set, for example, at 10 msec to 20 msec. In addition, the keyword detection unit 21 calculates two or more feature amounts each indicating a voice feature of the user, for each of the frames. The keyword detection unit 21 generates feature vectors using the feature amounts as elements, for the frame.

For example, the keyword detection unit 21 obtains a mel frequency cepstral coefficient (MFCC) and Δ cepstrum and ΔΔ cepstrum of the MFCC, as a feature amount indicating a voice feature of the user. Here, "Δ" means a "differential" or a "variance per time".

The keyword detection unit 21 sets, to the audio signal, a detection section having a length corresponding to a keyword that is a detection target. In addition, the keyword detection unit 21 searches for a most-likely phoneme series for the detection section in accordance with feature amounts that have been extracted from respective frames in the detection section. The most-likely phoneme series is a phoneme series obtained by arranging phonemes included in the voice audio in the utterance order, which is presumed to be most probable.

Therefore, the keyword detection unit 21 uses a Gaussian mixture model (GMM)-hidden Markov model (HMM) in which an output probability of each phoneme for a feature vector of the voice audio is calculated by a GMM, for example, by utilizing a HMM as an acoustic model.

Specifically, the keyword detection unit 21 calculates an output probability of the state of an HMM corresponding to each of the phonemes for each frame in the detection section by inputting a feature vector of the frame to the GMM. In addition, the keyword detection unit 21 may execute normalization called cepstral mean normalization (CMN) in which an average value is estimated for each element of the feature vector that has been calculated from each of the frames and the estimated average value is subtracted from a value of the element. In addition, the keyword detection unit 21 may input the normalized feature vector to the GMM.

The keyword detection unit 21 obtains, for each of the frames, a phoneme series having a maximum cumulative log-likelihood as a most-likely phoneme series for a target detection section by using the obtained output probability as an output probability for a state corresponding to a phoneme HMM.

For example, the keyword detection unit 21 calculates a logarithmization value of a probability (state transition probability) in which the state transitions from the state of an HMM of a phoneme candidate of the previous frame that is the transition source to the state of an HMM of a certain phoneme candidate in the current frame that is the transition destination. In addition, the keyword detection unit 21 calculates a logarithmization value of an output probability in the state of the HMM of the certain phoneme candidate of the current frame. In addition, the keyword detection unit 21 calculates a cumulative log-likelihood in the state of the HMM of the certain phoneme candidate of the current frame by adding the logarithmization values to the cumulative log-likelihood in the states of the HMMs of the phoneme candidates up to the previous frame. At this time, the keyword detection unit 21 selects a phoneme candidate of a transition source having the largest cumulative log-likelihood when the state transitions to the state of the HMM of the certain phoneme candidate of the current frame that is the transition destination from the state of the HMM of the phoneme candidate of the transition source. The keyword detection unit 21 performs Viterbi calculation in which such selection is performed for the states of HMMs of all phoneme candidates in the current frame, up to the last frame in the detection section. The keyword detection unit 21 may select state transition in which the above-described total reaches or passes a specific value. In addition, the keyword detection unit 21 selects a state in which a cumulative log-likelihood in the last frame becomes maximum, obtains a history (Viterbi path) of state transition up to such a state by a back-track method, and obtains a most-likely phoneme series in the detection section in accordance with the Viterbi path.

The keyword detection unit 21 determines whether a keyword has been uttered in the detection section by comparing the most-likely phoneme series and a phoneme series indicating utterance of the keyword (hereinafter simply referred to as a keyword phoneme series). For example, the keyword detection unit 21 calculates a coincidence degree between the most-likely phoneme series and the keyword phoneme series, and determines that the keyword has been uttered in the detection section when the coincidence degree has reached or passed a coincidence determination threshold value. For example, the keyword detection unit 21 calculates a ratio of the number of phonemes that have been coincided between the keyword phoneme series and the most-likely phoneme series to a total of phonemes included in the keyword phoneme series, as the coincidence degree. Alternatively, the keyword detection unit 21 may calculate a Levenshtein distance LD (also referred to as an edit distance) by performing dynamic programming matching between the keyword phoneme series and the most-likely phoneme series. In addition, the keyword detection unit 21 may calculate "1/(1+LD)" as the coincidence degree.

When the keyword detection unit 21 determines that the keyword has been uttered in the detection section, the keyword detection unit 21 notifies the request term detection unit 22 of the detection of the keyword. In addition, the keyword detection unit 21 notifies the adjusted audio signal generation unit 24 of the detection section in which the keyword has been detected.

In addition, when the coincidence degree has not reached the coincidence determination threshold value, the keyword detection unit 21 determines that the keyword that is a detection target has not been uttered in the target detection section. In addition, the keyword detection unit 21 may determine whether the keyword has been uttered by delaying a start timing of the detection section for the audio signal by the specific number of frames (for example, 1 to 2 frames) to reset the detection section and executing the above-described processing for the reset detection section.

When the keyword detection unit 21 notifies the request term detection unit 22 of the detection of the keyword, the request term detection unit 22 detects a request term from a section in which the user utters words which follow the keyword, in which the keyword has been detected in the audio signal (hereinafter, may be simply referred to as a following section).

Figure 4:
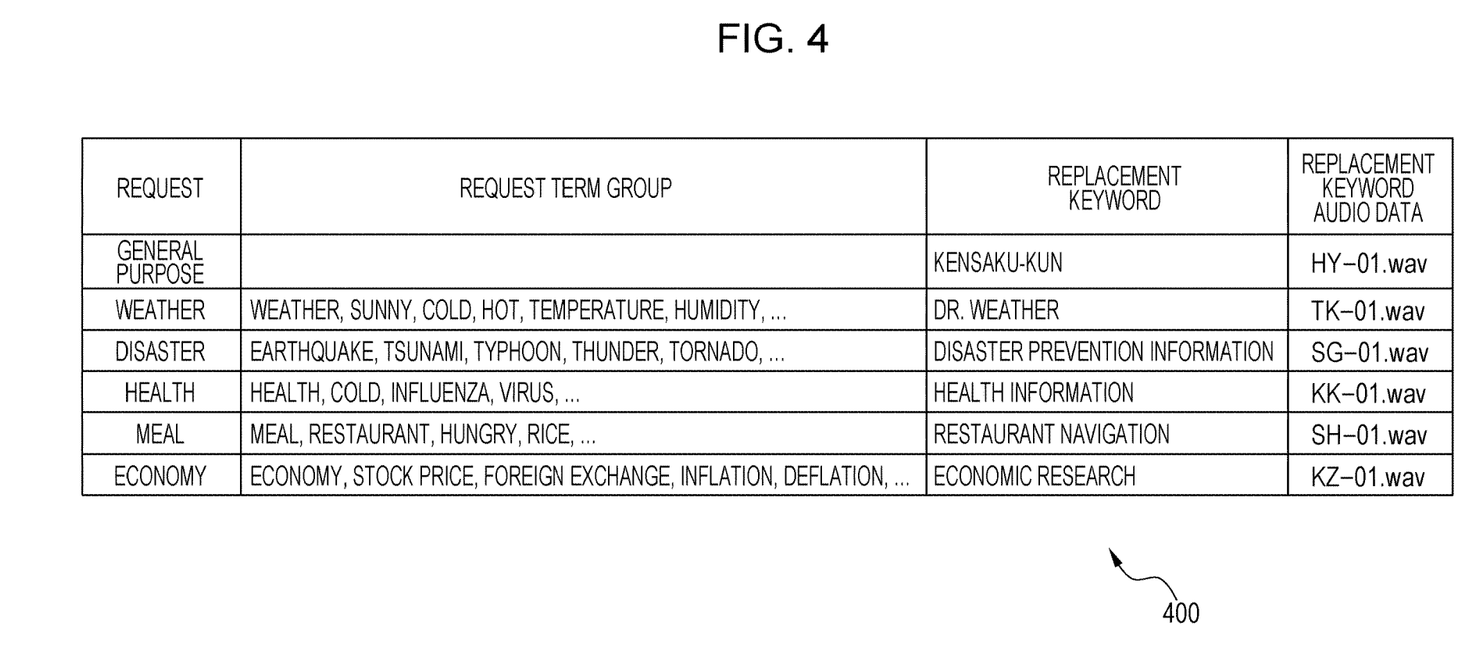
FIG. 4 is a diagram illustrating an example of a reference table indicating a correspondence relationship between a request term and a replacement keyword.

FIG. 4 is a diagram illustrating an example of a reference table indicating a correspondence relationship between a request term and a replacement keyword. In each field of the leftmost column of a reference table 400, a type of a request is indicated. The type of the request is set, for example, for each type of speech recognition processing. Alternatively, two or more requests may be associated with a single type of speech recognition processing. In addition, in each field to the right of the leftmost column of the reference table 400, a request term is indicated, which is assumed to be uttered by the user and is set for the request. For example, "weather", "sunny", "cold", "hot", "temperature", and "humidity" are set as request terms for a request "weather". In addition, for example, "meal", "restaurant", "hungry", and "rice" are set as request terms for a request "meal". As described above, for each of the requests, one or more request terms are set.

Similar to the keyword detection unit 21, the request term detection unit 22 detects a request term, for example, by applying any one of various word spotting technologies to the following section in the audio signal. Therefore, a phoneme series of each request term may be stored in the storage unit 15. In addition, for example, similar to the keyword detection unit 21, the request term detection unit 22 obtains a most-likely phoneme series by using a GMM-HMM and calculates a coincidence degree for the request term in accordance with the most-likely phoneme series. In addition, when the maximum value of the coincidence degree has reached or passed the coincidence determination threshold value, the request term detection unit 22 may determine that a request term corresponding to the maximum value of the coincidence degree is included in the following section. The request term detection unit 22 may determine that any request term is not included in the following section when the maximum value of the coincidence degree has not reached the coincidence determination threshold value.

The request term detection unit 22 may calculate the power of each frame immediately after the detection section in which the keyword has been detected in order to determine termination of the following section. In addition, for example, when frames each having power that does not reach a specific power threshold value are consecutive over a specific time period (for example, hundreds of milliseconds to a few seconds), the request term detection unit 22 determines that the following section has been terminated. In addition, it may be assumed that the specific power threshold value is, for example, a value obtained by adding a specific offset to the power corresponding to background noise.

The request term detection unit 22 notifies the request identification unit 23 of the detected request term. Alternatively, when the request term has not been detected in the following section, the request term detection unit 22 may notify the request identification unit 23 of the non-detection.

The request identification unit 23 is an example of a speech recognition type identification unit and identifies a request of the user in accordance with the detected request term.

For example, the request identification unit 23 identifies a request that has been associated with the detected request term to be the request of the user, with reference to the reference table. Here, a type of speech recognition processing to be applied varies depending on a request of the user, and therefore, in the embodiment, identification of a request of the user corresponds to determination of a type of speech recognition processing to be applied. In addition, when the request term has not been detected in the following section, the request identification unit 23 identifies the request of the user as "general purpose", which is not associated with any one of request terms.

The request identification unit 23 notifies the adjusted audio signal generation unit 24 of the identified request of the user.

The adjusted audio signal generation unit 24 generates an adjusted audio signal by replacing the audio data of the detection section in the audio signal, in which the keyword has been detected, with audio data of a replacement keyword corresponding to the identified request of the user.

Returning to FIG. 4, in each field to the left of the rightmost column in the reference table 400, for each of the requests, a replacement keyword corresponding to the request is indicated. In addition, in each field of the rightmost column in the reference table 400, audio data corresponding to the replacement keyword is indicated. For example, a replacement keyword "Dr. Weather" and audio data of "Dr. Weather" are associated with the request "weather" corresponding to request terms "weather", "sunny", "cold", and the like. The replacement keyword may be assumed to be, for example, a keyword used to start speech recognition processing the type of which matches the corresponding request.

When a request term has not been detected, the adjusted audio signal generation unit 24 may replace the audio data of the detection section of the audio signal, in which the keyword has been detected, for example, with audio data of a replacement keyword "Kensaku-kun" that has been associated with "general purpose" in the reference table 400.

As described above, when audio data of a detected keyword is replaced with audio data of a replacement keyword for a request corresponding to a detected request term, an adjusted audio signal is obtained that makes speech recognition processing the type of which matches the request start easily.

The processor 16 generates an inquiry signal including the adjusted audio signal. The inquiry signal may include information used to identify the terminal 1. In addition, the processor 16 outputs the inquiry signal to the speech recognition server through the communication interface unit 13. In addition, when the processor 16 receives a response signal including a speech recognition result (for example, a search result or the like based on recognized audio) from the speech recognition server, the processor 16 may display the speech recognition result on the user interface unit 14. Alternatively, when the terminal 1 includes a speaker (not illustrated), the processor 16 may generate an output audio signal representing the speech recognition result and output the output audio signal to the speaker.

Figure 5:
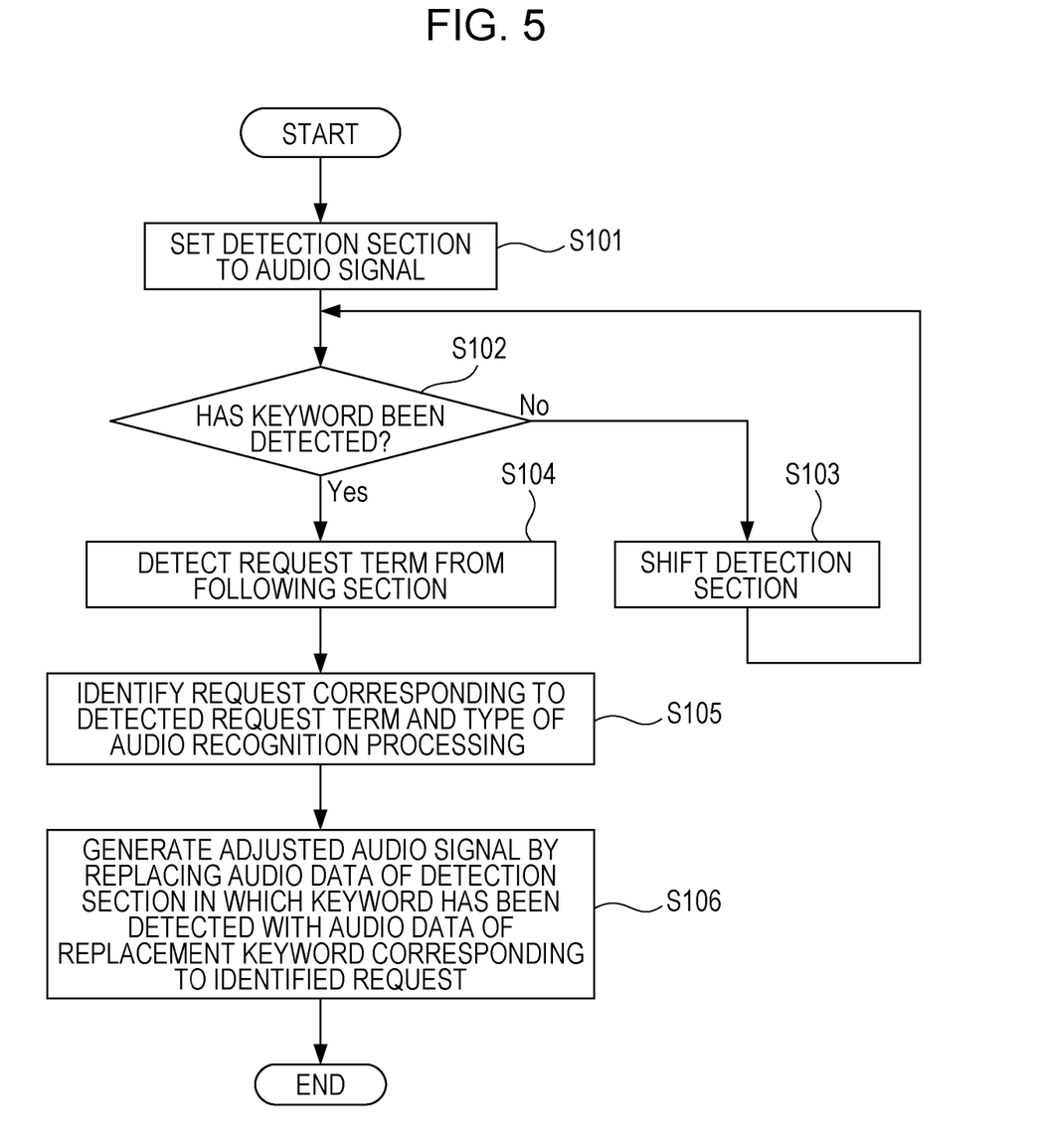
FIG. 5 is an operation flowchart of the speech recognition processing.

FIG. 5 is an operation flowchart of the speech recognition processing.

The keyword detection unit 21 sets a detection section to an audio signal that has been obtained from the microphone 11 (Step S101). In addition, the keyword detection unit 21 executes start keyword detection processing for the detection section and determines whether a keyword has been detected (Step S102). When the keyword has not been detected (Step S102-No), the keyword detection unit 21 shifts the detection section backward by the specific number of frames (Step S103). In addition, the keyword detection unit 21 repeats the processing of Step S102.

In addition, when the keyword has been detected in the detection section (Step S102—Yes), the request term detection unit 22 detects a request term from the following section in the audio signal (Step S104). In addition, the request identification unit 23 identifies a request corresponding to the detected request term, with reference to the reference table. As a result, the request identification unit 23 determines a type of speech recognition processing corresponding to the request (Step S105).

The adjusted audio signal generation unit 24 generates an adjusted audio signal by replacing audio data of the detection section in the audio signal, in which the keyword has been detected, with audio data of a replacement keyword corresponding to the identified request (Step S106). When any one of request terms has not been detected in the following section, the adjusted audio signal generation unit 24 may replace the audio data of the detection section in the audio signal, in which the keyword has been detected, with audio data of a general-purpose replacement keyword, as described above. In addition, the processor 16 outputs an inquiry signal including the adjusted audio signal, and ends the speech recognition processing.

As described above, when the speech recognition device detects a common keyword, which does not depend on a type of speech recognition processing from an input audio signal, the speech recognition device detects a request term from the following section that follows the detected keyword. In addition, the speech recognition device identifies a request of the user and a type of speech recognition processing to be applied, in accordance with the request term. In addition, the speech recognition device generates an adjusted audio signal by replacing audio data of the section in the audio signal, in which the keyword has been detected, with audio data of a replacement keyword corresponding to the identified request, and outputs the adjusted audio signal to the speech recognition server. Therefore, the speech recognition device may select and apply an appropriate type of speech recognition processing corresponding to the request of the user, from among two or more types of speech recognition processing by using the common keyword. As a result, the user may expect execution of highly-accurate speech recognition processing for the adjusted audio signal and obtain an appropriate speech recognition result corresponding to the request. In addition, the user may start any type of speech recognition processing by using a preferred keyword when the user sets a start common keyword in accordance with preference of the user.

In a modification, the adjusted audio signal generation unit 24 may include audio data of a request corresponding to a request term that has been detected from an audio signal in an adjusted audio signal, with audio data of a replacement keyword.

Figure 6:
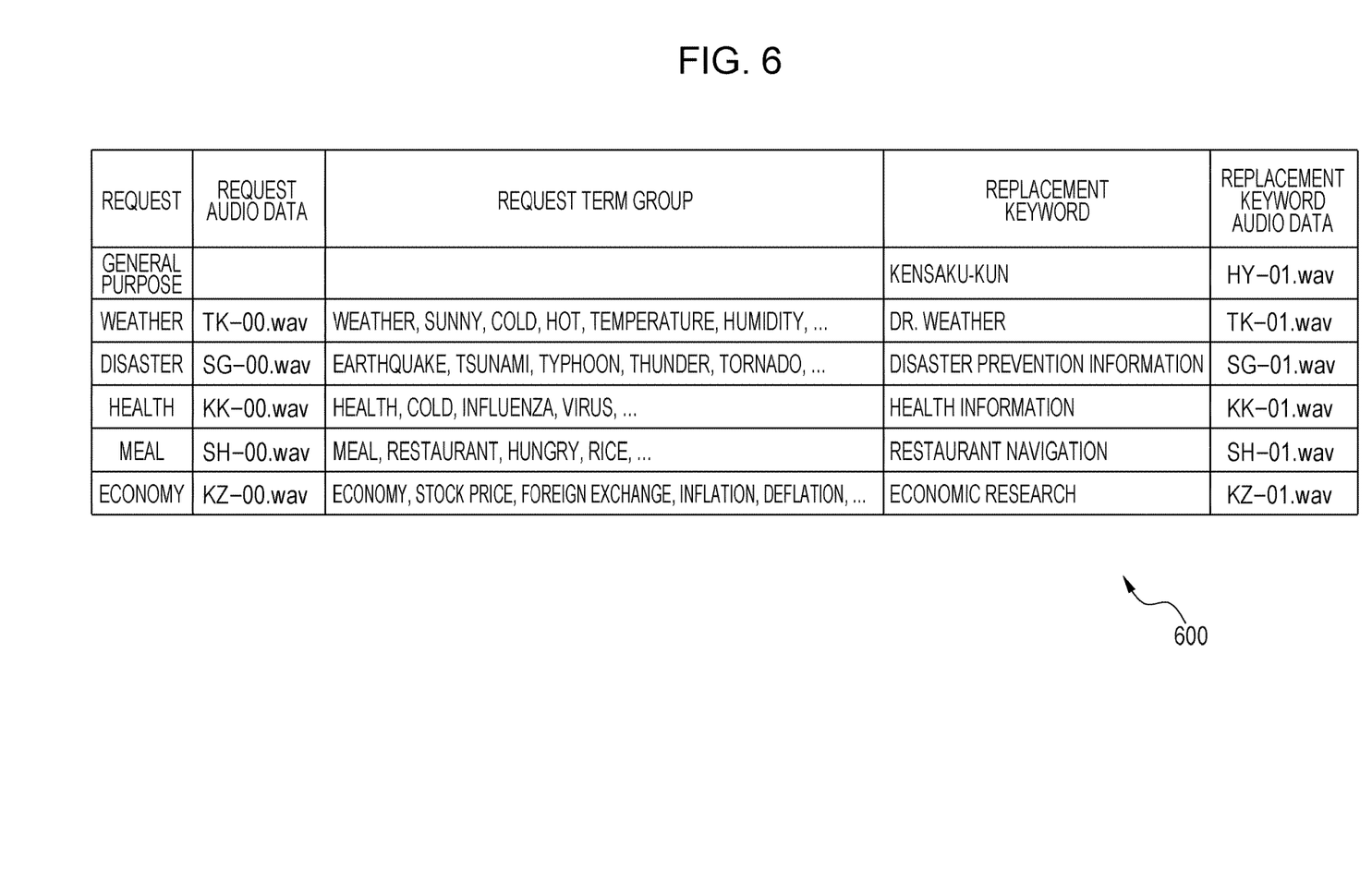
FIG. 6 is a diagram illustrating another example of a reference table indicating a correspondence relationship between a request term and a replacement keyword according to a modification.

FIG. 6 is a diagram illustrating another example of a reference table indicating a correspondence relationship between a request term and a replacement keyword according to the modification. A reference table 600 is different from the reference table 400 illustrated in FIG. 4 in that, audio data of each request is included as illustrated in each field to the right of the leftmost column.

Figure 7:
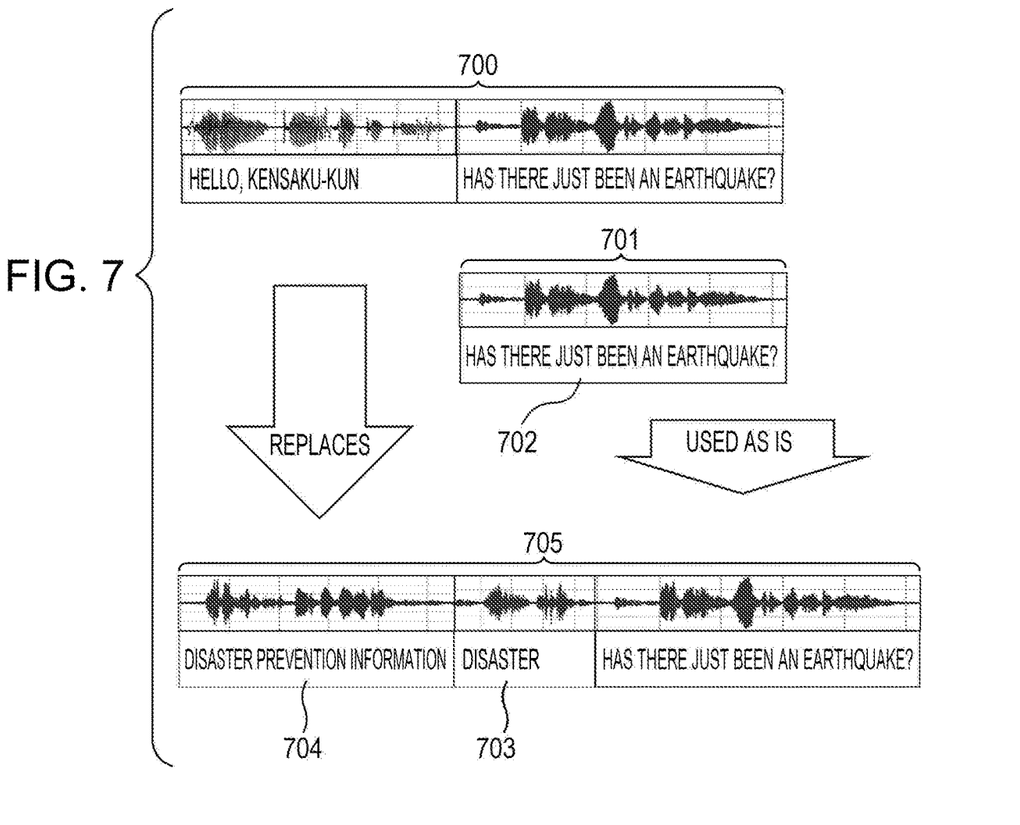
FIG. 7 is a diagram illustrating the overview of the speech recognition processing according to the modification.

FIG. 7 is a diagram illustrating the overview of speech recognition processing according to the modification. In this example, in an audio signal 700 that has been input through the microphone 11, voice audio of the user "Hello, Kensaku-kun, has there just been an earthquake?" is indicated. Here, it is assumed that "Hello, Kensaku-kun" is a start keyword. In this case, in Step S102 of the flowchart illustrated in FIG. 5, the keyword detection unit 21 detects the keyword "Hello, Kensaku-kun" from the audio signal 700. In addition, in Step S104 of the flowchart illustrated in FIG. 5, the request term detection unit 22 detects a request term indicating a request of the user from a section 701 of the audio signal 700, in which the user utters words which follow the keyword. In this example, the request term detection unit 22 detects a request term "earthquake" 702 from the section 701. In addition, the adjusted audio signal generation unit 24 identifies audio data of a replacement keyword "disaster prevention information" 704 for a request "disaster" 703 corresponding to the request term "earthquake" 702, with reference to the reference table 600. In addition, the adjusted audio signal generation unit 24 identifies audio data of the request "disaster" 703 corresponding to the request term "earthquake", with reference to the reference table 600. In addition, in Step S106 of the flowchart illustrated in FIG. 5, the adjusted audio signal generation unit 24 replaces audio data of the section corresponding to the keyword "Hello, Kensaku-kun" in the audio signal 700 with the identified audio data of the replacement keyword "disaster prevention information" 704. In addition, the adjusted audio signal generation unit 24 generates an adjusted audio signal 705 by adding the audio data of the request "disaster" 703 between the audio data of the replacement keyword 704 and audio data of the following section 701.

In this example, in the adjusted audio signal 705, the audio data of the request "disaster" 703 is added between the audio data of the replacement keyword "disaster prevention information" 704 and the audio data of the section of the audio signal 700, in which the user utters the words which follow the keyword "Hello, Kensaku-kun". However, the audio data of the request "disaster" 703 may be added after the audio data of the section of the audio signal 700, in which the user has uttered the words which follow the keyword "Hello, Kensaku-kun". It is desirable that the audio data of the replacement keyword "disaster prevention information" 704 is arranged at the beginning of the adjusted audio signal 705. As a result, even when the speech recognition processing executed by the speech recognition server is started by the replacement keyword, the processor 16 may recognize voice audio voice that has been uttered by the user in the speech recognition processing.

In this modification, the speech recognition device may include audio data indicating a request of the user in an adjusted audio signal, and therefore, a probability in which a speech recognition result corresponding to the request is obtained may be improved in the speech recognition processing by the speech recognition server.

In addition, in another modification, a different speech recognition server may be associated with each request corresponding to a request term that has been detected from an audio signal. In this case, for example, identification information on a speech recognition server corresponding to the request may be included in a reference table. In addition, the processor 16 may output an inquiry signal including an adjusted audio signal to the speech recognition server that has been associated with the request corresponding to the request term that has been detected from the audio signal through the communication interface unit 13.

In addition, in another modification, two or more replacement keywords may be associated with a request. In addition, the different number of replacement keywords may be associated with each request.

Figure 8:
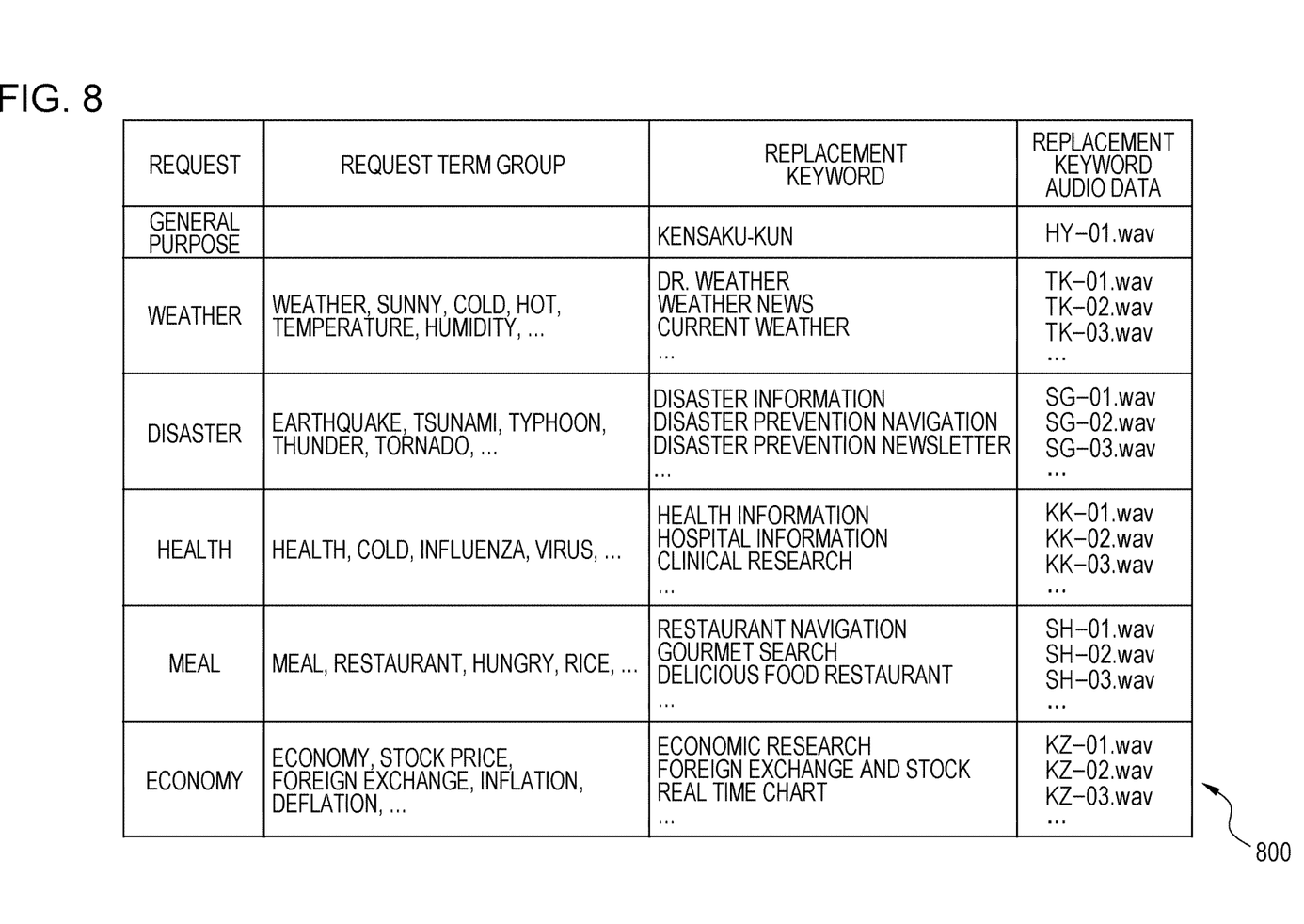
FIG. 8 is a diagram illustrating another example of a reference table indicating a correspondence relationship between a request term and a replacement keyword according to a modification.

FIG. 8 is a diagram illustrating another example of a reference table indicating a correspondence relationship between a request term and a replacement keyword according to the modification. A reference table 800 is different from the reference table 400 illustrated in FIG. 4 in that, as illustrated in each field to the left of the rightmost column and each field of the rightmost column, two or more replacement keywords and pieces of audio data of the respective replacement keywords are associated with each request.

Figure 9:
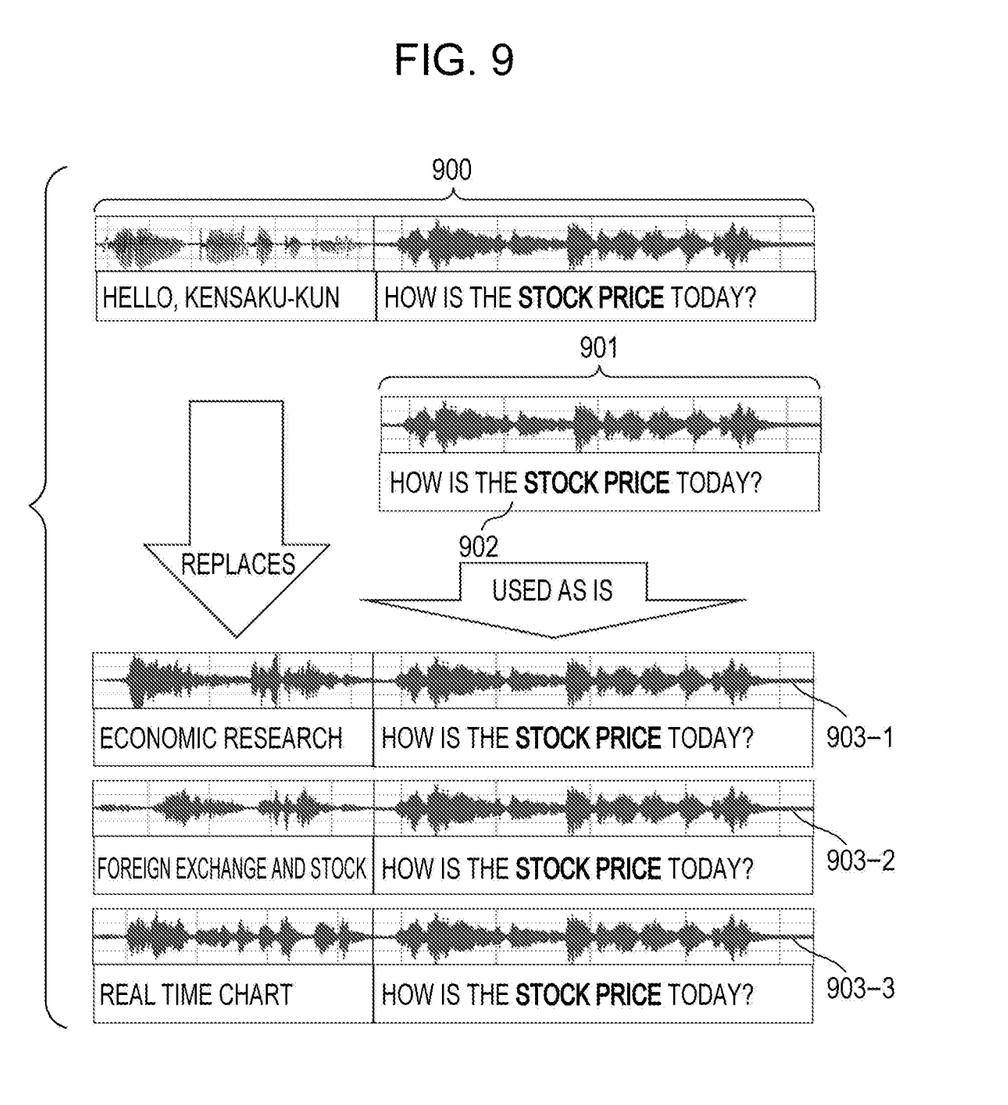
FIG. 9 is a diagram illustrating the overview of the speech recognition processing according to the modification.

FIG. 9 is a diagram illustrating the overview of speech recognition processing according to such a modification. In this example, in an audio signal 900 that has been input through the microphone 11, voice audio of the user "Hello, Kensaku-kun, how is the stock price today?" is indicated. Here, it is assumed that "Hello, Kensaku-kun" is a start keyword. In this case, in Step S102 of the flowchart illustrated in FIG. 5, the keyword detection unit 21 detects the keyword "Hello, Kensaku-kun" from the audio signal 900. In addition, in Step S104 of the flowchart illustrated in FIG. 5, the request term detection unit 22 detects a request term indicating a request of the user from a section 901 of the audio signal 900, in which the user utters words which follow the keyword. In this example, the request term detection unit 22 detects a request term "stock price" 902 from the section 901. Thus, in Step S106 of the flowchart illustrated in FIG. 5, the adjusted audio signal generation unit 24 identifies a replacement keyword associated with a request "economy" corresponding to the request term "stock price" 902, with reference to the reference table 800. In this example, "economic research", "foreign exchange and stock", and "real time chart" are identified as replacement keywords. The adjusted audio signal generation unit 24 replaces audio data of the section corresponding to the keyword "Hello, Kensaku-kun" in the audio signal 900 with pieces of audio data of the identified replacement keywords "economic research", "foreign exchange and stock", and "real time chart". As a result, the adjusted audio signal generation unit 24 generates three adjusted audio signals 903-1 to 903-3. In addition, for each of the adjusted audio signals, the processor 16 generates an inquiry signal including the adjusted audio signal and outputs the inquiry signal to a speech recognition server through the communication interface unit 13.

Even in such a modification, a different speech recognition server may be associated with each request. Alternatively, a different speech recognition server may be associated with each replacement keyword. In this case, identification information on the associated speech recognition server may be included in the reference table for the replacement keyword.

In this modification, the speech recognition device may generate adjusted audio signals each having audio data of a different replacement keyword, for a request corresponding to a request term included in an input audio signal. Therefore, the speech recognition device may apply two or more different types of speech recognition processing to a single request, and as a result, the speech recognition device may obtain two or more speech recognition results for the single request. The processor 16 may improve accuracy of speech recognition or accuracy of the obtained result by executing processing such as majority vote for the obtained two or more speech recognition results.

In another modification, there is a case in which two or more request terms are detected in a following section. For example, when a coincidence degree reaches or passes the coincidence determination threshold value for each of the request terms, the request term detection unit 22 may detect the two or more request terms. In such a case, the adjusted audio signal generation unit 24 may use, for generation of an adjusted audio signal, audio data of a replacement keyword the coincidence degree of which becomes maximum, that is, a replacement keyword corresponding to a most probable request term, from among the detected request terms. Alternatively, the adjusted audio signal generation unit 24 may generate an adjusted audio signal for each of the detected request terms. In this case, it is only sufficient that the adjusted audio signal generation unit 24 generates an adjusted audio signal for each of the request terms by replacing audio data of a detection section in which the keyword has been detected with audio data of a replacement keyword corresponding to the request term.

In addition, when speech recognition processing executed in the speech recognition server is not started by a specific keyword, audio data of a replacement keyword may not be included in an adjusted audio signal. Therefore, in another modification, the processor 16 may not perform replacement with audio data of a replacement keyword corresponding to a detected request term. That is, the adjusted audio signal generation unit 24 may be omitted. In this case, identification information on a speech recognition server corresponding to each request may be included in the reference table. In addition, the processor 16 identifies a speech recognition server corresponding to the request that has been associated with the detected request term, with reference to the reference table. In addition, the processor 16 may output an inquiry signal including the audio signal to the identified speech recognition server through the communication interface unit 13.

Even in this modification, the speech recognition device may execute speech recognition processing the type of which matches an audio signal by detecting a request term that has been uttered in a section that follows a common keyword.

In addition, in another modification, there may be two or more start keywords. In this case, the reference table according to the above-described embodiment or modification is associated with each of the start keywords, and the reference table for the start keyword may be stored in the storage unit 15. In this case, the speech recognition device may obtain a different request term to be detected, and a different identified request of the user and speech recognition processing corresponding to the request, depending on a keyword uttered by the user.

In addition, in another modification, a speech recognition device may execute two or more types of speech recognition processing. In this case, it is only sufficient that the speech recognition device executes speech recognition processing the type of which matches a request that has been associated with a detected request term for the adjusted audio signal that has been generated in accordance with the above-described embodiment or modification.

In addition, in another modification, in the reference table according to the above-described embodiment or modification, a request may be omitted. In this case, a speech recognition device does not identify a request of the user in accordance with a detected request term, and it is only sufficient that the adjusted audio signal generation unit 24 identifies a replacement keyword corresponding to the detected request term in accordance with the reference table. In addition, it is only sufficient that the adjusted audio signal generation unit 24 generates an adjusted audio signal by replacing audio data of a section in which a start keyword has been detected with audio data of the replacement keyword.

In addition, in another modification, an adjusted audio signal generation unit 24 may generate an adjusted audio signal by adding audio data of a replacement keyword at the beginning of an input audio signal or immediately after a section in which a start keyword has been detected without replacement of audio data of the start keyword.

A computer program that causes a computer to realize each function included in the processor of the speech recognition device according to the above-described embodiment or modification may be provided so as to be recorded in a computer-readable medium such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable medium storing a computer program that causes a computer to execute a process for speech recognition, the process comprising:
   detecting a first keyword uttered by a user from an audio signal representing a voice of the user;
   detecting a term indicating a request of the user from sections that follow the first keyword in the audio signal; and
   determining a type of speech recognition processing, from among at least two different types of speech recognition processing, to be applied to the following sections in accordance with the detected term indicating the request of the user;
   identifying a second keyword corresponding to the detected term indicating the request of the user, from among two or more second keywords;
   generating an adjusted audio signal by adding audio data of the identified second keyword; and
   outputting the adjusted audio signal to a speech recognition server.

2. The non-transitory computer readable medium according to claim 1, wherein, in the generating, the audio data of the first keyword in the audio signal is replaced with the audio data of the identified second keyword.

3. The non-transitory computer readable medium according to claim 1,
   wherein each of the at least two different types of speech recognition processing corresponds to each of at least two different search engines using speech recognition.

4. The non-transitory computer readable medium according to claim 2, the process further comprising adding audio data of the request of the user, which corresponds to the detected term indicating the request of the user, to the adjusted audio signal.

5. The non-transitory computer readable medium according to claim 2, wherein in the generation of the adjusted audio signal,
   when there are two or more second keywords, each of which is corresponding to the detected term indicating the request of the user, two or more adjusted audio signals are generated by replacing audio data of the first keyword in the audio signal with each piece of audio data of the two or more second keywords corresponding to the term, respectively.

6. The non-transitory computer readable medium according to claim 2, wherein in the generation of the adjusted audio signal,
   when there are two or more detected terms, each of which is the detected term indicating the request of the user, the adjusted audio signal is generated by replacing audio data of the first keyword in the audio signal with audio data of the second keyword corresponding to a most probable term, from among the detected two or more terms.

7. The non-transitory computer readable medium according to claim 2, wherein in the generation of the adjusted audio signal,
   when there are two or more detected terms, each of which is the detected term indicating the request of the user, two or more of the adjusted audio signals are generated by replacing audio data of the first keyword in the audio signal with each piece of audio data of the two or more second keywords corresponding to the detected two or more terms.

8. The non-transitory computer readable medium according to claim 1, wherein there are two or more of the first keywords, each corresponding to a respective term indicating a respective request of the user and to a respective type of speech recognition processing,
   wherein in the detecting the term indicating the request of the user, the term indicating the request of the user is detected from among terms corresponding to the detected first keyword from among the two or more of the first keywords, and
   wherein in the determining the type of speech recognition processing, the type of speech recognition processing is determined in accordance with the detected term indicating the request of the user from among the at least two different types of speech recognition processing corresponding to the detected first keyword among the two or more of the first keywords.

9. A speech recognition apparatus comprising:
   a memory, and
   a processor coupled to the memory and configured to execute a process comprising:
   detecting a first keyword uttered by a user from an audio signal representing a voice of the user;
   detecting a term indicating a request of the user from sections that follow the first keyword in the audio signal; and
   determining a type of speech recognition processing, from among at least two different types of speech recognition processing, to be applied to the following sections in accordance with the detected term indicating the request of the user;
   identifying a second keyword corresponding to the detected term indicating the request of the user, from among two or more second keywords;
   generating an adjusted audio signal by adding audio data of the identified second keyword; and
   outputting the adjusted audio signal to a speech recognition server.

10. A speech recognition method to be performed by a computer, the method comprising:
    detecting a first keyword uttered by a user from an audio signal representing a voice of the user;
    detecting a term indicating a request of the user from sections that follow the first keyword in the audio signal; and
    determining a type of speech recognition processing, from among at least two different types of speech recognition processing, applied to the following sections in accordance with the detected term indicating the request of the user,
    detecting a first keyword uttered by a user from an audio signal representing a voice of the user;
    detecting a term indicating a request of the user from sections that follow the first keyword in the audio signal; and
    determining a type of speech recognition processing, from among at least two different types of speech recognition processing, to be applied to the following sections in accordance with the detected term indicating the request of the user;

identifying a second keyword corresponding to the detected term indicating the request of the user, from among two or more second keywords;
generating an adjusted audio signal by adding audio data of the identified second keyword; and
outputting the adjusted audio signal to a speech recognition server.

* * * * *